Patented Apr. 3, 1951

2,547,504

UNITED STATES PATENT OFFICE 2,547,504

PURIFICATION OF TETRACHLORO-PHTHALIC ANHYDRIDES

George W. Steahly, Maplewood, Mo., assignor to Monsanto Chemical Company, St. Louis, Mo., a corporation of Delaware No Drawing. Application August 11, 1949, Serial No. 109,819

19 Claims. (Cl. 260—341)

This invention relates to tetrachlorophthalic anhydrides; more specifically, this invention relates to the purification of crude tetrachlorophthalic anhydride.

Tetrachlorophthalic anhydride is generally prepared by the chlorination of phthalic anhydride in the presence of a suitable catalyst, such as ferric chloride, molybdenum chloride, etc. The chlorinated reaction product thus obtained generally contains varying quantities of impurities which impart a dark color to the chlorinated reaction product. The problem of separating tetrachlorophthalic anhydride from such impurities is particularly difficult in commercial operations since the quantity and nature of the impurities vary considerably from batch to batch and from day to day. Crude tetrachlorophthalic anhydride is generally purified by a distillation without fractionation. When such a method of purification is utilized, it is virtually impossible to prevent, according to the methods heretofore used, the carrying over of some of these impurities into the distillate. Consequently, a simple distillation of crude tetrachlorophthalic anhydride as heretofore practiced does not permit efficient separation of the impurities from the tetrachlorophthalic anhydride, and the resulting distillate, therefore, is generally highly colored as a result of the carrying over of these impurities during the distillation. Furthermore, a simple distillation of crude tetrachlorophthalic anhydride as heretofore practiced, results in a distillate having a very strong, penetrating, disagreeable odor.

In the past a similar difficulty was encountered in the purification of phthalic anhydride. It was found, however, that crude phthalic anhydride could be purified by treating the material with various chemical treating agents at a temperature essentially above 270° C. for a period of time to permit separation by distillation of phthalic anhydride from the impurities therein. Typical agents for phthalic anhydride purification were calcium oxide, calcium hydroxide, and sulfuric acid. However, and as pointed out in my copending application Serial No. 109,820, filed August 11, 1949, contrary to what would be expected, it has been found that chlorophthalic anhydrides did not respond to the same type of purification treatment that proved to be acceptable or of utility for phthalic anhydride. It was found that no predictable correlation exists between the methods for purifying phthalic anhydride and methods for purifying various chlorophthalic anhydrides. The problem of purifying tetrachlorophthalic anhydride has been found to be unique and distinct from the problem encountered in purifying phthalic anhydride.

One object of this invention is to provide a simple and efficient method of purifying crude tetrachlorophthalic anhydride.

A further object of this invention is to provide an improved method of preparing a purified tetrachlorophthalic anhydride which is characterized by a substantially water white color and improved odor.

Further objects will become apparent from the description of the novel process of this invention and the claims.

This invention is practiced in general by subjecting crude tetrachlorophthalic anhydride to a chemical treatment and then physically separating the tetrachlorophthalic anhydride from the impurities in purified form in a suitable manner. The chemical treatment comprises heating a mixture of crude tetrachlorophthalic anhydride and a small proportion of an alkaline salt of an alkali metal at a temperature above about 260° C. for a period of time sufficient to substantially complete the reaction between such agent and the impurities in the crude tetrachlorophthalic anhydride. Thus, this treatment is of such duration as to materially alter the volatility of the impurities to the extent that tetrachlorophthalic anhydride can be distilled therefrom without a carrying over of the impurities with the tetrachlorophthalic anhydride vapor. Purified tetrachlorophthalic anhydride may then be separated from the mixture by distillation, generally under reduced pressure.

The quantity of the alkaline salt of an alkali metal employed, the duration of the treatment and the particular temperature employed in the treatment, are to a certain extent dependent upon each other and also to the type of impurities in the crude, and are so correlated with the particular crude under treatment to produce tetrachlorophthalic anhydride of the desired purity. In general, it is desirable in the treatment of most crudes to employ the alkaline salt of an alkali metal in the amount of about 1–2% by weight of the crude. With some crudes it is possible to employ less of the chemical treating agent, and at times quantities as low as .05% by weight of the alkaline salt of an alkali metal may suffice. On the other hand, other crudes may require larger quantities of the alkaline salt of an alkali metal, at times even as high as 10% by weight. When more of the treating agent is employed than is required to effect purification, the excess is not generally harmful or detrimental, per se, in respect to the tetrachlorophthalic anhydride. However, the residue which is obtained on distillation of the treated tetrachlorophthalic anhydride may be viscous or difficult to distill, and separation of the final portions of the tetrachlorophthalic anhydride may be extremely difficult.

The temperature at which such purification treatment is carried out is above about 260° C. and preferably at the boiling point of tetrachlorophthalic anhydride, either at atmospheric pressure or under reduced pressure. The treatment is generally sufficient after heating or refluxing at such temperature for a period of about 6 hours, although a shorter time may suffice in some instances and a longer time of treatment may be required if desired. Preferably, the treatment is carried out at a temperature above about 260° C. for a period of time sufficient to substantially complete the reaction between such purifying agent and the impurities in the crude or otherwise act on the impurities so that purified tetrachlorophthalic anhydride may be separated therefrom.

Any of the alkaline salts of an alkali metal may be utilized in the novel purification process of this invention. Typical of such salts are the sodium, potassium and lithium carbonates, the sodium, potassium and lithium bicarbonates, the sodium, potassium and lithium acetates, the sodium, potassium and lithium propionates, etc. By alkaline salt is meant a salt, the aqueous solutions of which have a pH greater than 7.0. Of particular utility because of their obvious economic advantages, are the alkali metal carbonates and bicarbonates.

The novel process of this invention will be more clearly understood from the following illustrative examples and the claims.

Example I 500 g. of a crude tetrachlorophthalic anhydride, prepared by the chlorination of phthalic anhydride in the presence of a ferric chloride catalyst, is charged to a glass still. Under reduced pressure the crude tetrachlorophthalic anhydride is subjected to a simple distillation without fractionation. The distilled tetrachlorophthalic anhydride thus obtained has a dark yellow color and a strong, penetrating odor.

Example II 10 g. of calcium oxide is added to 490 g. of a crude tetrachlorophthalic anhydride similar to that utilized in Example I. With constant agitation the mixture is heated and refluxed at atmospheric pressure for a period of about 6 hours, aftter which time the tetrachlorophthalic anhydride is distilled therefrom under reduced pressure. The distilled tetrachlorophthalic anhydride thus obtained has a color and odor substantially the same as that obtained in Example I.

Example III 5 g. of sodium carbonate and 495 g. of a crude tetrachlorophthalic anhydride similar to that utilized in Example I are refluxed for a period of 6 hours at a temperature of about 283° C. and an absolute pressure of 115 mm. Hg. Tetrachlorophthalic anhydride is distilled therefrom under reduced pressure. The tetrachlorophthalic anhydride thus obtained is essentially water white in color and has a significantly less intense odor than that obtained in Example I.

Example IV 10 g. of sodium bicarbonate and 490 g. of a crude tretrachlorophthalic anhydride similar to that utilized in Example I are heated at a temperature of about 280° C. at atmospheric pressure for a period of about 8 hours. Under reduced pressure tretachlorophthalic anhydride is then distilled therefrom. The tetrachlorophthalic anhydride thus obtained is essentially water white in color with a significantly less intense odor than that possessed by the distillate obtained in Examples I or II.

Example V

A mixture containing 15 g. of sodium acetate and 485 g. of a crude tetrachlorophthalic anhydride similar to that used in Example I are refluxed at atmospheric pressure for a period of about 8 hours. The refluxing temperature is about 335° C. Tetrachlorophthalic anhydride is distilled therefrom under reduced pressure. The tretrachlorophthalic anhydride thus obtained is essentially water white with a significantly less intense odor than that obtained in Examples I or II.

Example VI

A mixture containing 0.5 g. of potassium carbonate and 499.5 g. of a crude tetrachlorophthalic anhydride are refluxed at atmospheric pressure for a period of about 12 hours. After this chemical treatment, tetrachlorophthalic anhydride is distilled therefrom under reduced pressure. The tetrachlorophthalic anhydride thus obtained is essentially colorless and has a less intense odor than that obtained in Examples I or II.

Example VII

Treating 495 g. of a crude tetrachlorophthalic anhydride similar to that used in Example I with 5 g. of potassium bicarbonate in a manner as described in Example IV, results in a purified tetrachlorophthalic anhydride which is substantially water white in color and possesses a significantly less intense odor than that prepared in Examples I or II.

What is claimed is:

1. A method of purifying crude tetrachlorophthalic anhydride, which comprises heating crude tetrachlorophthalic anhydride in the presence of an alkaline salt of an alkali metal at a temperature above about 260° C. for a period of time sufficient to permit separation of said tetrachlorophthalic anhydride from the impurities therein by distillation, and then separating said tetrachlorophthalic anhydride therefrom in purified form.

2. In a process for the purification of crude tetrachlorophthalic anhydride, the step comprising heating crude tetrachlorophthalic anhydride in the presence of an alkaline salt of an alkali metal at a temperature above about 260° C. for a period of time sufficient to permit separation of the tetrachlorophthalic anhydride from the impurities therein.

3. The process as described in claim 2 wherein the alkaline salt of an alkali metal is an alkali metal carbonate.

4. The process as described in claim 2 wherein the alkaline salt of an alkali metal is sodium carbonate.

5. The process as described in claim 2 wherein the alkaline salt of an alkaline metal is potassium bicarbonate.

6. The process as described in claim 2 wherein the alkaline salt of an alkali metal is an alkali metal bicarbonate.

7. The process as described in claim 2 wherein the alkaline salt of an alkali metal is sodium bicarbonate.

8. In a process for the purification of crude tetrachlorophthalic anhydride, the step comprising refluxing crude tetrachlorophthalic anhydride in the presence of an alkaline salt of an alkali metal at a temperature above about 260° C. for a period of time sufficient to permit separation of the tetrachlorophthalic anhydride from the impurities therein.

9. The process as described in claim 8 wherein the alkaline salt of an alkali metal is an alkali metal carbonate.

10. The process as described in claim 8 wherein the alkaline salt of an alkali metal is sodium carbonate.

11. The process as described in claim 8 wherein the alkaline salt of an alkali metal is potassium carbonate.

12. The process as described in claim 8 wherein the alkaline salt of an alkali metal is an alkali metal bicarbonate.

13. The process as described in claim 8 wherein the alkaline salt of an alkali metal is sodium bicarbonate.

14. In a process for the purification of crude tetrachlorophthalic anhydride, the step comprising refluxing crude tetrachlorophthalic anhydride under reduced pressure in the presence of an alkaline salt of an alkali metal at a temperature above about 260° C. for a period of time sufficient to permit separation of the tetrachlorophthalic anhydride from the impurities therein.

15. The process as described in claim 14 wherein the alkaline salt of an alkali metal is an alkali metal carbonate.

16. The process as described in claim 14 wherein the alkaline salt of an alkali metal is sodium carbonate.

17. The process as described in claim 14 wherein the alkaline salt of an alkali metal is potassium carbonate.

18. The process as described in claim 14 wherein the alkaline salt of an alkali metal is an alkali metal bicarbonate.

19. The process as described in claim 14 wherein the alkaline salt of an alkali metal is sodium bicarbonate.

GEORGE W. STEAHLY.

REFERENCES CITED

The following references are of record in the file of this patent:

UNITED STATES PATENTS

| Number | Name | Date |
|---|---|---|
| 1,728,225 | Bowers | Sept. 17, 1929 |
| 1,817,304 | Foster | Aug. 4, 1931 |
| 2,356,449 | Engel | Aug. 22, 1944 |